(12) United States Patent
Bubolz et al.

(10) Patent No.: US 11,072,440 B2
(45) Date of Patent: Jul. 27, 2021

(54) APPARATUS FOR SUPPORTING AN AIRCRAFT COMPONENT ADJACENT TO AN AIRCRAFT AND A METHOD FOR THE SAME

(71) Applicant: Gulfstream Aerospace Corporation, Savannah, GA (US)

(72) Inventors: Jason Bubolz, Savannah, GA (US); Pierce Wanner, Savannah, GA (US); Dion Rasmussen, Savannah, GA (US); Charles Gosz, Savannah, GA (US); Steven Greely, Savannah, GA (US); Gregg Pattison, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 212 days.

(21) Appl. No.: 16/242,177

(22) Filed: Jan. 8, 2019

(65) Prior Publication Data

US 2020/0216197 A1 Jul. 9, 2020

(51) Int. Cl.
*B64F 5/50* (2017.01)
*B66F 5/00* (2006.01)

(52) U.S. Cl.
CPC . *B64F 5/50* (2017.01); *B66F 5/00* (2013.01)

(58) Field of Classification Search
CPC ...... B64F 5/10; B64F 5/00; B64F 5/40; B64F 5/50; B64F 5/60; B66F 3/36; B66F 3/38; B66F 5/00; B66F 5/04; B66C 23/48; B66C 23/485; Y10S 254/16
See application file for complete search history.

(56) References Cited

U.S. PATENT DOCUMENTS

| | | | | |
|---|---|---|---|---|
| 1,279,711 A * | 9/1918 | Knight | .................. | F16H 57/023 74/609 |
| 1,812,585 A * | 6/1931 | Collins | ................ | B25H 1/0007 269/59 |
| 5,203,540 A * | 4/1993 | Lee | ....................... | B25H 1/0007 254/124 |
| 2010/0072442 A1 * | 3/2010 | Bolton | .................... | B66C 23/48 254/325 |
| 2017/0106972 A1 * | 4/2017 | Sobajima | ................ | B64C 25/20 |
| 2017/0174485 A1 * | 6/2017 | Vogel | ........................ | B66F 3/38 |

* cited by examiner

*Primary Examiner* — Tyrone V Hall, Jr.
(74) *Attorney, Agent, or Firm* — LKGlobal | Lorenz & Kopf, LLP (57) ABSTRACT

Apparatuses for supporting an aircraft component adjacent to an aircraft and methods for the same are provided. In one example, the apparatus includes an adapter for removably coupling to the aircraft component. A winch subassembly includes an axle that is coupled to the adapter and has a longitudinal axis. A first gear is operatively coupled to the axle to drive the axle to rotate about the longitudinal axis for rotating the adapter. The winch subassembly is configured to couple to a lift to position the adapter adjacent to the aircraft.

20 Claims, 9 Drawing Sheets

APPARATUS FOR SUPPORTING AN AIRCRAFT COMPONENT ADJACENT TO AN AIRCRAFT AND A METHOD FOR THE SAME

TECHNICAL FIELD

The technical field relates generally to installing, removing, and/or servicing of a component of an aircraft, and more particularly, relates to an apparatus for supporting an aircraft component adjacent to an aircraft for installing, removing, and/or servicing the aircraft component.

BACKGROUND

In the aircraft industry, various components or the like are installed and/or removed from an aircraft, and/or require service maintenance during the life of the aircraft. For example, aircraft landing gear systems include many structural and system components including a main fitting(s), shock absorber(s) including shock strut(s), bogie beam/trailing arm(s), axle(s), torque link(s), side brace actuator(s), and the like that require service maintenance.

Typically, aircraft components such as shock struts and side brace actuators are removed from the aircraft at scheduled intervals for inspection and/or maintenance and are reinstalled thereafter. The process for removing and reinstalling shock struts and side brace actuators often requires multiple technicians, e.g., three or more persons, to perform such a set of tasks. For example, two technicians may be focused on supporting a shock strut or side brace actuator in a relatively crowded gear well area while a third technician removes the attaching pins that couple the aircraft component to the aircraft. After disconnecting the shock strut or side brace actuator, the technicians lower the aircraft component and move it out of the gear well area. The shock strut or side brace actuator is then carried to a support table/cart for inspection. After inspection, the shock strut or side brace actuator is lifted from the support table/cart and is carried back over to the relatively crowded gear well area and is raised into position for installation. The technicians lowering, moving, and lifting the aircraft component are often supporting and/or carrying 100 pounds or more from a position from waist level to above their heads. Unfortunately, such a sequence of steps for removing, moving for inspecting and/or servicing, and reinstalling the aircraft component is cumbersome and inefficient for the technicians.

Accordingly, it is desirable to provide an apparatus and a method for supporting an aircraft component adjacent to an aircraft for installing, removing, and/or servicing the aircraft component. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an apparatus for supporting an aircraft component adjacent to an aircraft, and various non-limiting embodiments of a method for supporting in the aircraft component adjacent to an aircraft, are provided herein.

In a first non-limiting embodiment, the apparatus includes, but is not limited to, an adapter for removably coupling to the aircraft component. The apparatus further includes, but is not limited to, a winch subassembly. The winch subassembly includes an axle that is coupled to the adapter and has a longitudinal axis. A first gear is operatively coupled to the axle to drive the axle to rotate about the longitudinal axis for rotating the adapter. The winch subassembly is configured to couple to a lift to position the adapter adjacent to the aircraft.

In another non-limiting embodiment, the apparatus includes, but is not limited to, an adapter for removably coupling to the aircraft component. The apparatus further includes, but is not limited to, a winch subassembly. The winch subassembly includes an axle that is coupled to the adapter and has a longitudinal axis. A first gear is operatively coupled to the axle to drive the axle to rotate about the longitudinal axis for rotating the adapter. The apparatus further includes, but is not limited to, a support structure that is coupled to the winch subassembly and extends therefrom from in a direction away from the winch subassembly. The apparatus further includes, but is not limited to, a lift that is coupled to the support structure. The lift is configured to position the adapter adjacent to the aircraft.

In another non-limiting embodiment, the method includes, but is not limited to, coupling a winch subassembly to a lift. The method further includes, but is not limited to, coupling an adapter to the winch subassembly. The method further includes, but is not limited to, moving the lift to position the adapter adjacent to the aircraft. The method further includes, but is not limited to, rotating the adapter with the winch subassembly. The method further includes, but is not limited to, removably coupling the aircraft component to the adapter.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses for supporting an aircraft component adjacent to an aircraft for installing, removing, and/or servicing the aircraft component. The apparatus includes an adapter and a winch subassembly. The adapter is configured to removably couple to and support the aircraft component. The winch subassembly includes an axle that is coupled to the adapter and has a longitudinal axis. A gear is operatively coupled to the axle to drive the axle to rotate about the longitudinal axis for rotating the adapter, for example, to adjust the orientation of the adapter to a rotated position aligned with the aircraft component for its removal from or installation to the aircraft. A support structure is coupled to the winch subassembly and extends therefrom from in a direction away from the winch subassembly. A lift is coupled to the support structure and is configured to position the adapter adjacent to the aircraft, for example, by moving the lift along the floor towards the aircraft and further, by moving the adapter vertically, upward and/or downward, to a desired height.

In an exemplary embodiment, fewer than three technicians, for example one or two technicians, can effectively and efficiently use the apparatus to support and/or carry an aircraft component while the aircraft component is being disconnected and removed from the aircraft, moved to a support table/cart for inspection and/or servicing, and reinstalled back to the aircraft. Further, the aircraft component is fully or substantially supported by the apparatus so the technician(s) does not bear the weight of the aircraft component during the foregoing sequence of steps.

Figure 1:
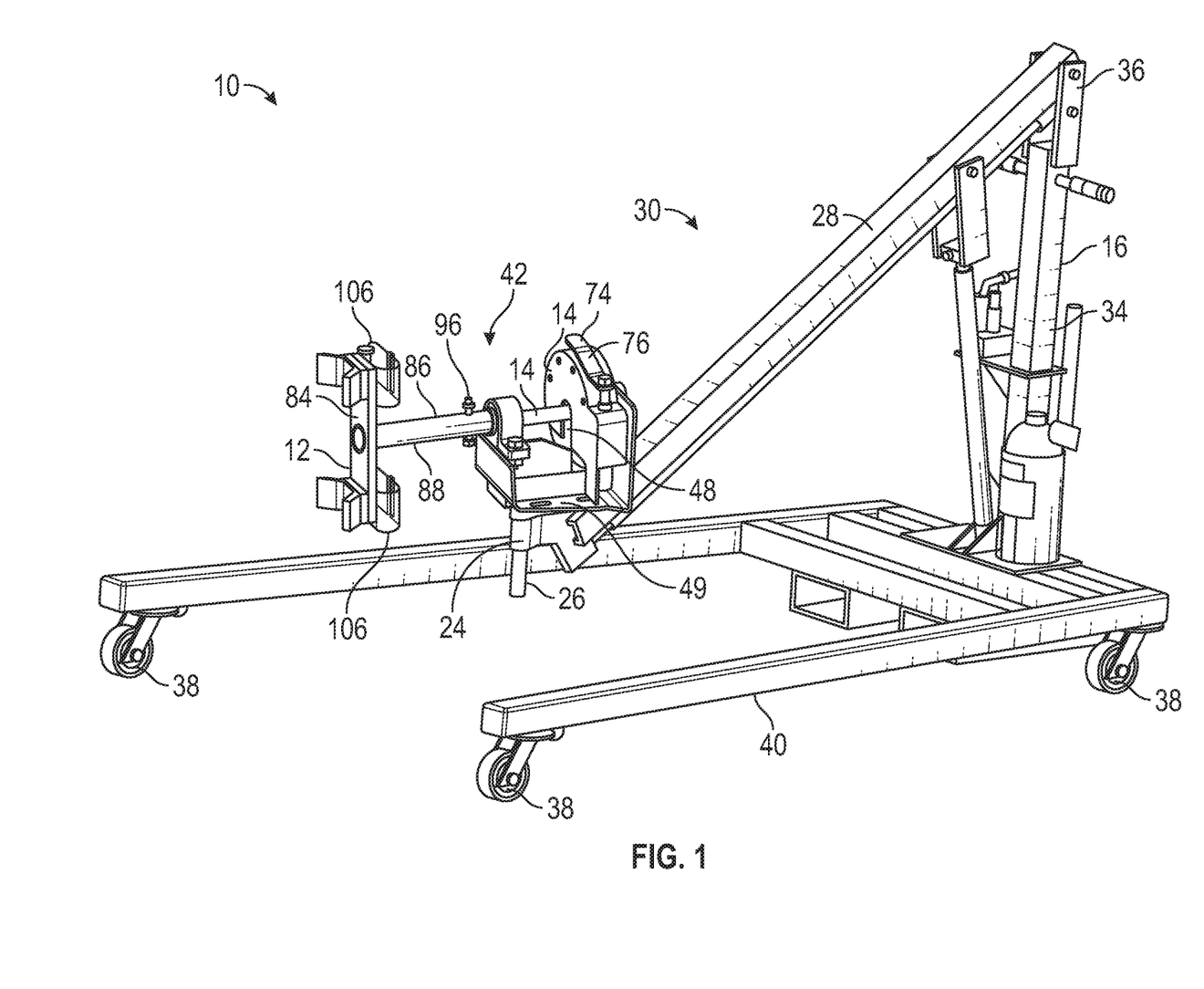
FIG. 1 illustrates a perspective view of an apparatus including an adapter, a winch subassembly, support structure, and a lift for supporting an aircraft component adjacent to an aircraft in accordance with an exemplary embodiment.
Figure 2:
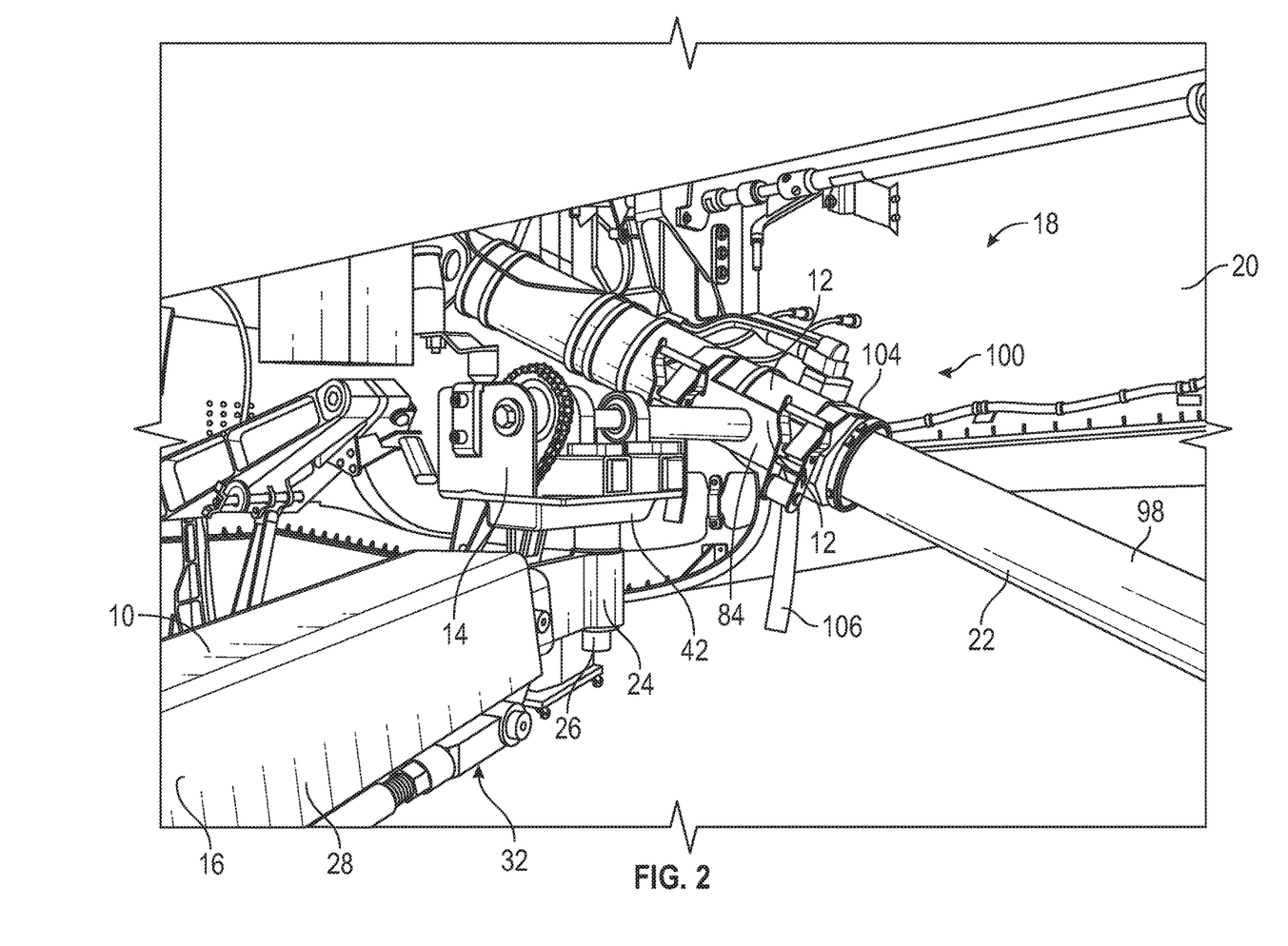
FIG. 2 illustrates a perspective view of a portion of an apparatus including an adapter, a winch subassembly, support structure, and a lift that is supporting an aircraft component adjacent to an aircraft in accordance with an exemplary embodiment.

FIG. 1 illustrates a perspective view of an apparatus 10 including an adapter 12, a winch subassembly 14, and a lift 16 in accordance with an exemplary embodiment. FIG. 2 illustrates a perspective view of a gear well area 18 of an aircraft 20 and the apparatus 10 which is supporting an aircraft component 22 in the gear well area 18 adjacent to the aircraft 20 in accordance with an exemplary embodiment.

As illustrated, the lift 16 includes a holding member 24, e.g. sleeve, ring, cup, or other retaining member, that holds a "shaft-like" support structure 26 that is coupled to the winch subassembly 14 in a substantially upright or vertical orientation. In an exemplary embodiment, the support structure 26 is removably coupled to and positionally adjustable within the holding member 24.

Figure 3:
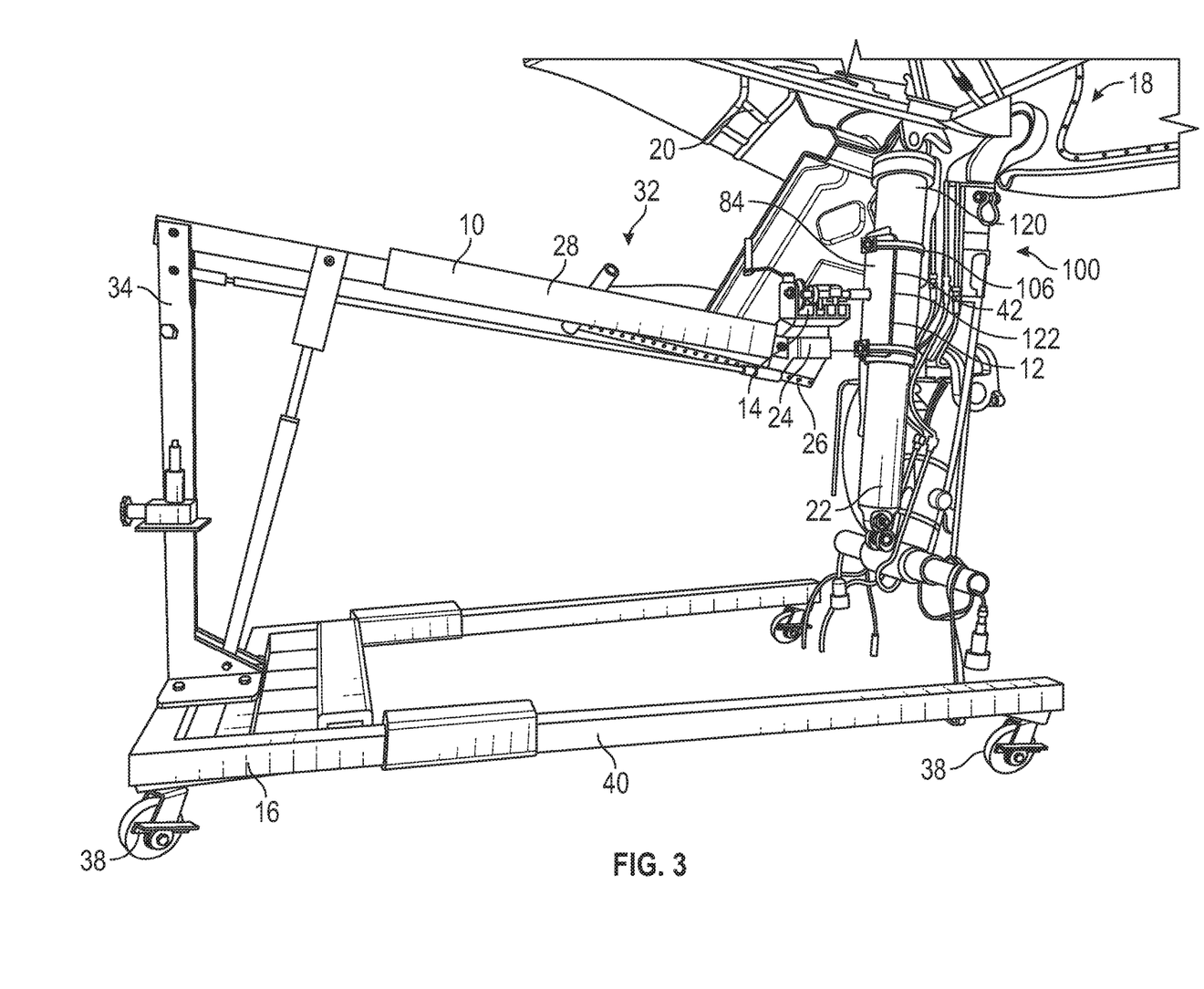
FIG. 3 illustrates a perspective view of a portion of an apparatus including an adapter, a winch subassembly, support structure, and a lift that is supporting an aircraft component adjacent to an aircraft in accordance with an exemplary embodiment.

The holding member 24 is pivotally coupled to a pivot arm 28 of the lift 16 to maintain the support structure 26 in the substantially upright or vertical orientation as the pivot arm 28 moves from a retracted position 30 (as shown in FIG. 1) vertically upward to an at least partially extended position 32 (as shown in FIGS. 2-3) adjacent to the aircraft 20. The pivot arm 28 is pivotably coupled to a support body 34 about a pivot point 36 to move between the retracted and the at least partially extended positions 30 and 32 (e.g., vertically upward and/or downward). The lift 16 may also include wheels 38 that are attached to a base frame 40 that supports the support body 34 to allow the lift 16 to be moved along the floor, platform, or other relatively horizonal or sloped surface by applying manual force (e.g., pushing and/or pulling) to the lift 16.

In an exemplary embodiment, the lift 16 is a universal lift and movement of the pivot arm 28 may be achieved by application of pressure to the pivot arm 28, thereby rotating the pivot arm 28 upward. The application of pressure can be hydraulic, pneumatic, or mechanical. Depending on the power system employed on the lift 16, it may require no power to lower (e.g., rotate downward) the pivot arm 28, but rather just the force of gravity and a simple release of hydraulic or pneumatic pressure. Universal lifts are commercially available under the trade name Tronair® Universal Lifts, which are manufactured by Tronair Inc., located at 1 Air Cargo Parkway East, Swanton, Ohio 43558. Other types of lifts known to those skilled in the art may be used to move the adapter 12, winch subassembly 14, and the support structure 26 vertically upward and downward.

Referring also to FIGS. 1-2, 4-7 and 10, as discussed above, the apparatus 10 includes the adapter 12, the winch subassembly 14, and the support structure 26 that together form a tool assembly 42. The tool assembly 42 is coupled to the lift 16 to position the adapter 12, which removably couples to the aircraft component 22, for supporting the aircraft component 22 adjacent to the aircraft 20 for removing and reinstalling the aircraft component 22 to the aircraft 20. Further, the tool assembly 42 and the lift 16 can also be used to carry the aircraft component 22, for example, from the aircraft 20 to another area for inspection and/or servicing and back to the aircraft 20 for reinstallation.

The winch assembly 14 includes an axle 44 that is supported on a mounting base 49 and that is coupled to the adapter 12. The axle 44 extends along a longitudinal axis 46 from a gear 48 to the adapter 12. As will be discussed in further detail below, the gear 48 is operatively coupled to the axle 44 to drive the axle 44 to rotate about the longitudinal axis 46, thereby rotating the adapter 12 to a desired orientation or rotated position. In an exemplary embodiment, the axle 44 is supported on the mounting base 49 via spaced apart axle guides 52 and 54. The axle guides 52 and 54 are mounted on and coupled to the mounting base 49. The axle guides 52 and 54 have corresponding guide openings 56 and 58. Portions 60 and 62 of the axle 44 are correspondingly disposed in the guide openings 56 and 58 to rotationally couple the axle 44 to the axle guides 52 and 54.

In an exemplary embodiment, a guard subassembly 64 is coupled to the mounting base 49 and is disposed between the axle guides 52 and 54. As illustrated, the gear 48 is fixedly coupled to the axle 44 and the guard subassembly 64 is disposed about or otherwise substantially encases the gear 48 adjacent to the axle guide 52. Further, the guard subassembly 64 is disposed about or otherwise substantially encases a drive gear 50.

Figure 10:
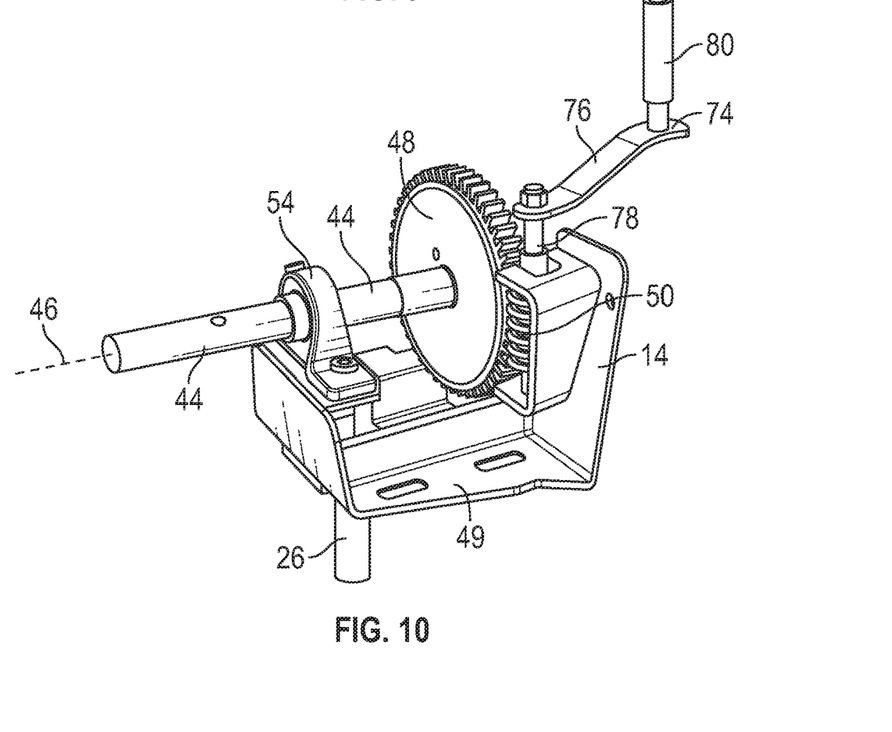
FIG. 10 illustrates a perspective tear-away view of a winch subassembly and a support structure in accordance with an exemplary embodiment.

The drive gear 50 meshes with the gear 48 to drive the axle 44 to rotate. As illustrated in FIG. 10, in an exemplary embodiment, the gear 48 and the drive gear 50 are configured as a worm drive arrangement in which the gear 48 is a worm gear having teeth and the drive gear 50 is a worm screw gear having threads. The threads of the worm screw gear mesh with the teeth of the worm gear as the worm screw gear rotates about its longitudinal axis. Other gear arrangements known to those skilled in the art may be used in lieu of a worm drive arrangement to drive the axle 44 to rotate.

Figure 4:
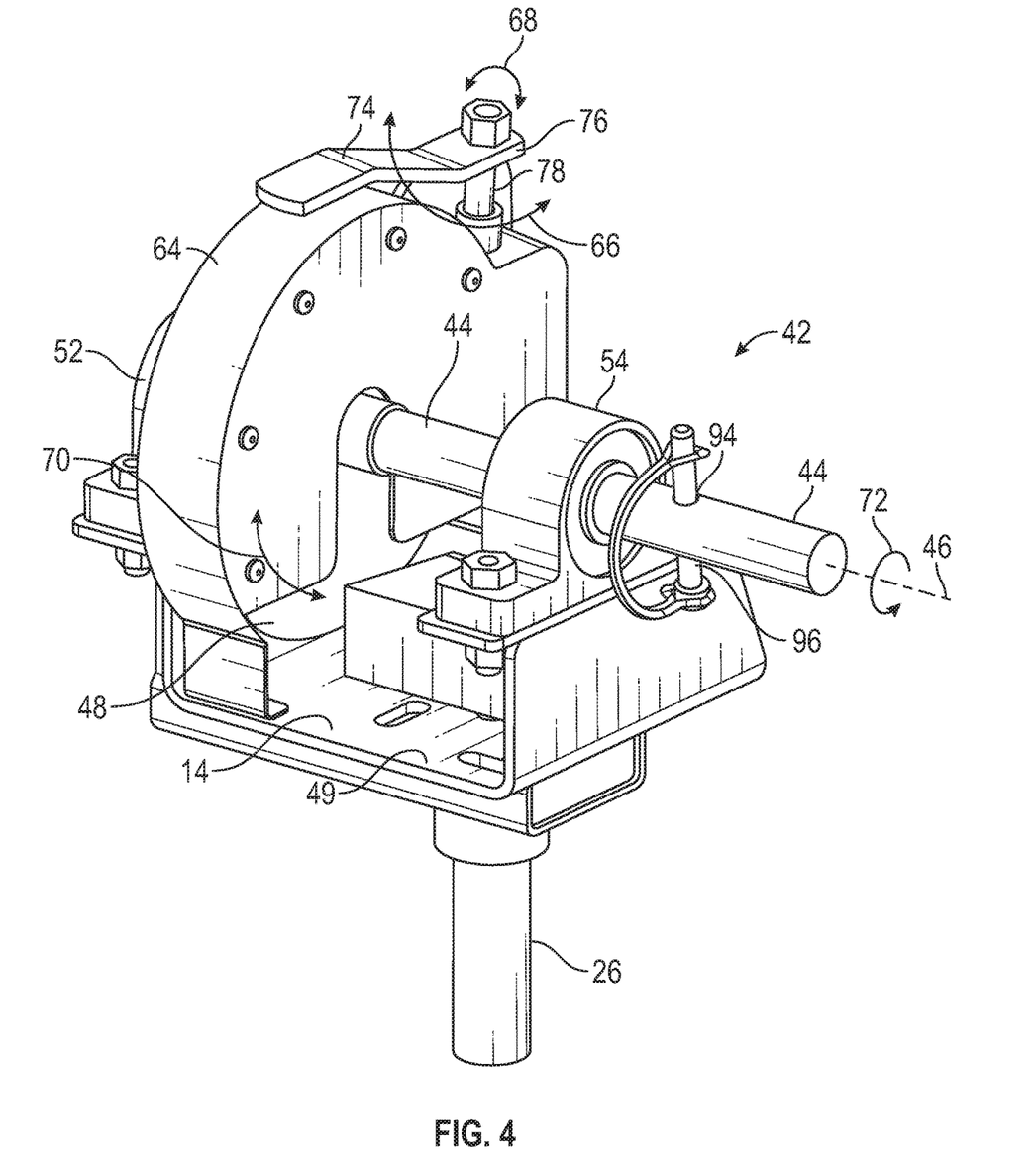
FIG. 4 illustrates a perspective view of a winch subassembly and a support structure in accordance with an exemplary embodiment.
Figure 5:
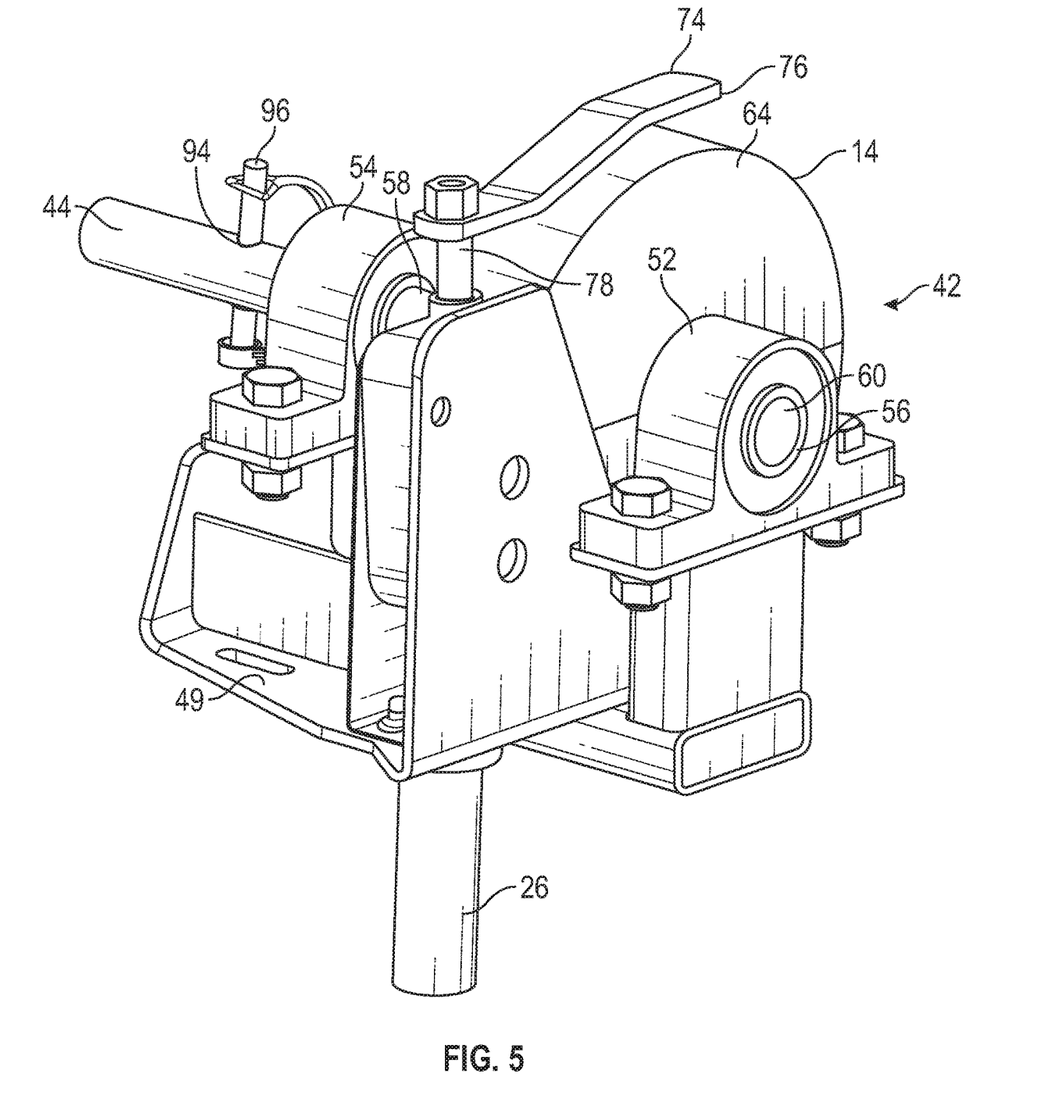
FIG. 5 illustrates a perspective view of a winch subassembly and a support structure in accordance with an exemplary embodiment.
Figure 6:
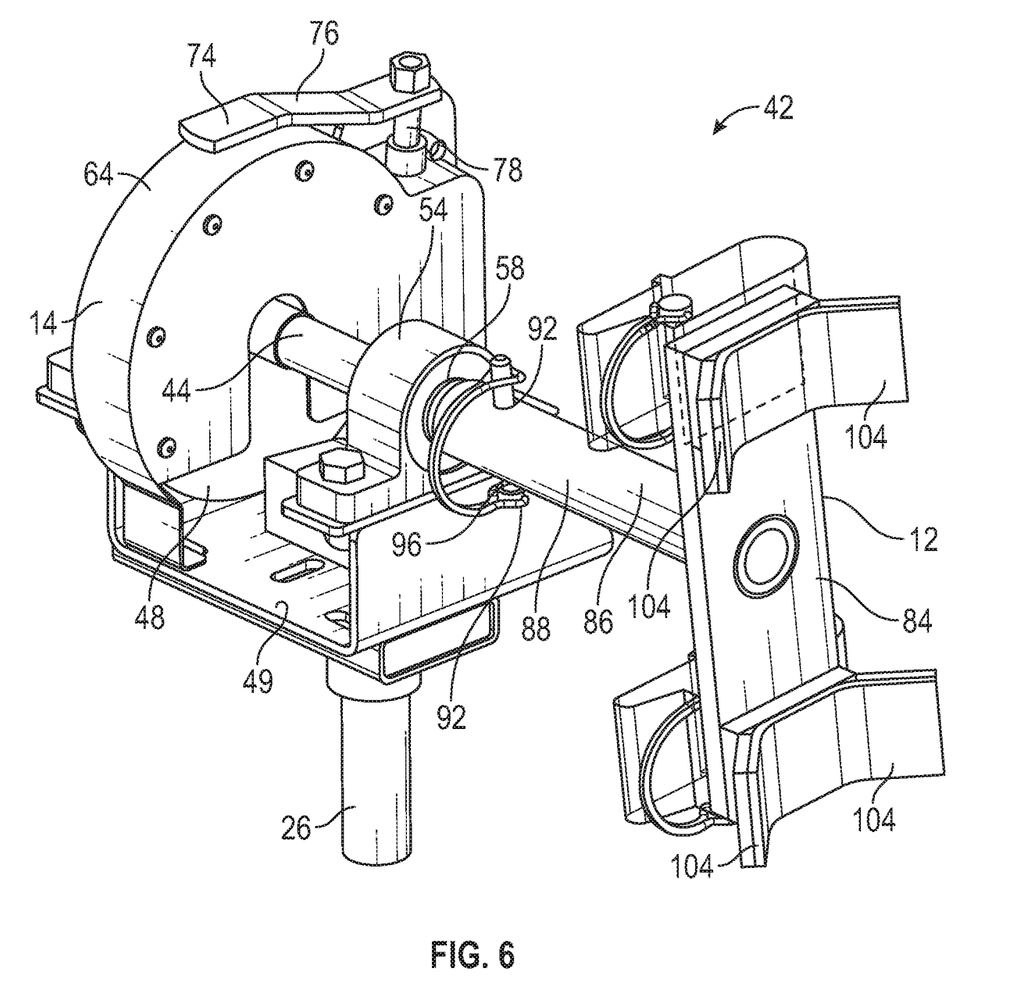
FIG. 6 illustrates a perspective view of an adapter, a winch subassembly, and a support structure in accordance with an exemplary embodiment.
Figure 7:
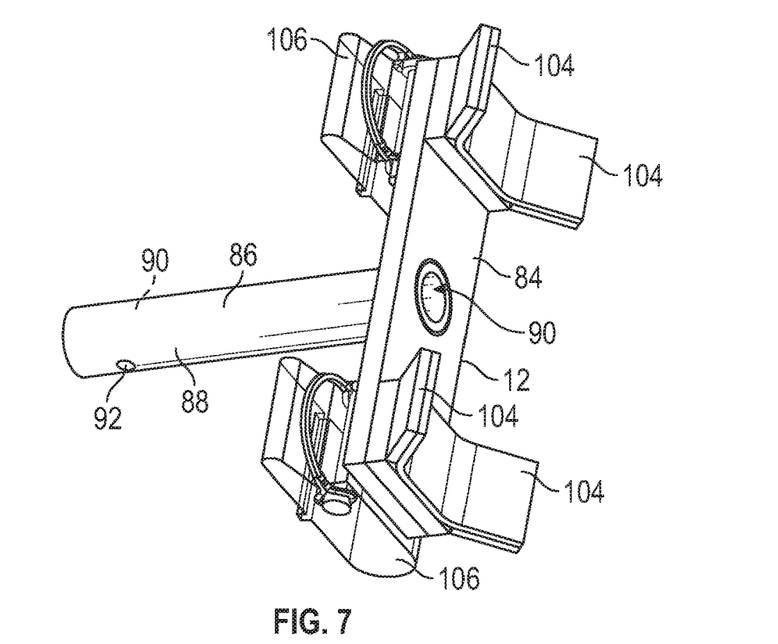
FIG. 7 illustrates a perspective view of an adapter in accordance with an exemplary embodiment.
Figure 8:
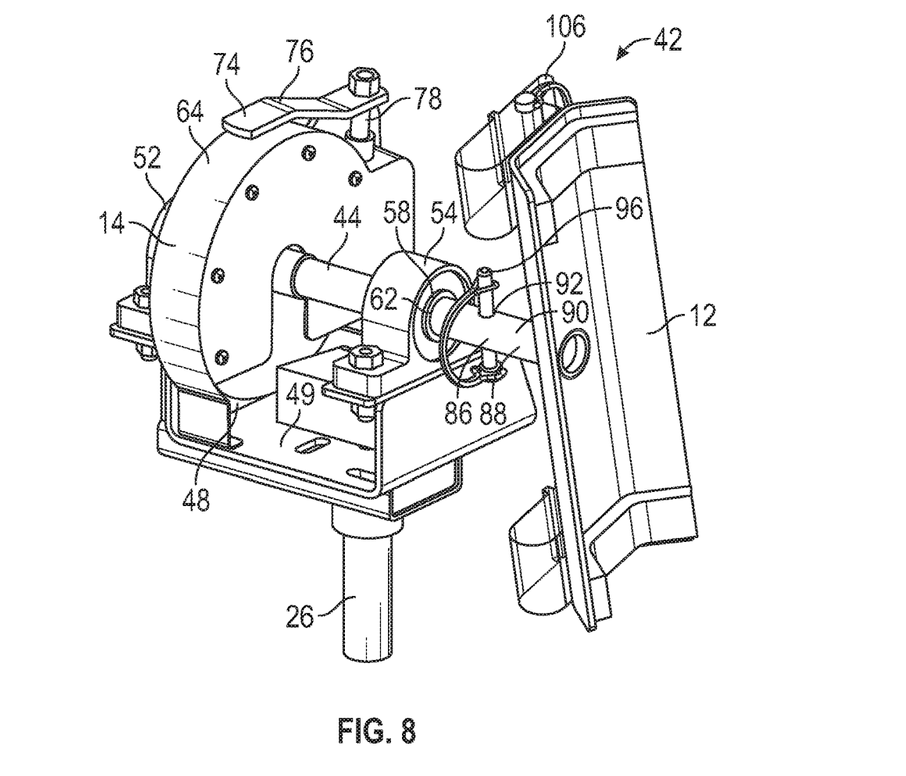
FIG. 8 illustrates a perspective view of an adapter, a winch subassembly, and a support structure in accordance with an exemplary embodiment.

Referring back to FIGS. 1-2, 4-7 and 10, in an exemplary embodiment, a manual actuating member 74 is operatively coupled to the drive gear 50 to rotate the drive gear 50 to drive the gear 48 and the axle 44 to rotate. As illustrated, the manual actuating member 74 includes an arm 76 that is disposed outside of the guard subassembly 64 and a shaft 78 that extends from the arm 76 through the guard subassembly 64 to the drive gear 50. As illustrated in FIG. 4, when the arm 76 is moved in either the clockwise or counterclockwise directions (indicated by double headed arrow 66), the shaft 78 correspondingly rotates (indicated by double headed arrow 68) the drive gear 50 which drives the gear 48 and the axle 44 to correspondingly rotate (indicated by double headed arrows 70 and 72).

Figure 11:
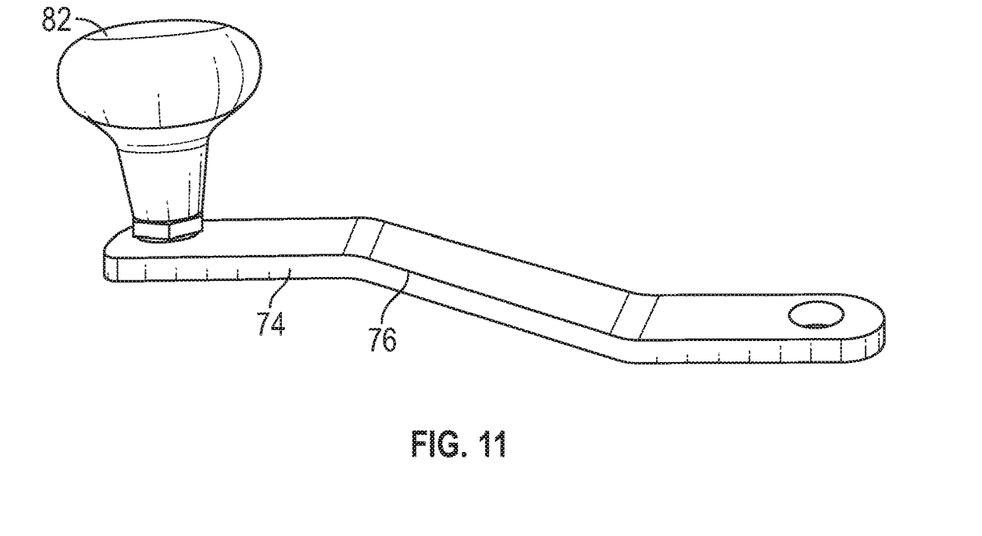
FIG. 11 illustrates a side view of a portion of a manual actuating member in accordance with an exemplary embodiment.

As illustrated in FIG. 10, the manual actuating member 74 may include a handle 80, or alternatively and as illustrated in FIG. 11, a knob 82 that is coupled, for example, to a distal end section of the arm 76. In an exemplary embodiment, the handle 80 or the knob 82 can be grabbed up or otherwise held by a technician to facilitate moving the arm 76 in the clockwise or counterclockwise directions 66.

With continuing reference to FIGS. 1-2, 4-7 and 10, in an exemplary embodiment, the adapter 12 is removably coupled to the distal portion of the axle 44. The adapter 12 includes a base plate 84 and a tube section 86 that extends rearwardly from the base plate 84. The tube section 86 has a tube wall 88 that surrounds a channel 90. The distal portion of the axle 44 is disposed in the channel 90 and is coupled to the tube wall 88. In an exemplary embodiment, tube section 86 has wall openings 92 formed through the tube wall 88 that are aligned. Likewise, the axle 44 has an axle opening 94 formed through its distal portion that is aligned with the wall openings 92 of the adapter's tube wall 88. A locking pin 96 is disposed through the wall openings 92 and the axle opening 94 to couple the adapter 12 to the distal portion of the axle 44. To remove the adapter 12 from the axle 44, the locking pin 96 is removed from the openings 92 and 94 to decouple the tube section 86 from the axle 44 and to allow the adapter 12 to be pulled off or otherwise removed from the axle 44.

In an exemplary embodiment, the adapter 12 is configured for receiving and holding or otherwise coupling to the aircraft component 22. In one example, and with reference to FIGS. 2-7, the aircraft component is a side brace 98 for an aircraft landing gear 100 and the adapter 12 is configured for removably coupling to the side brace 98. As illustrated, the adapter 12 includes sidearms 104 that are coupled to the base plate 84 on a side opposite the tube section 86. The sidearms 104 extend in generally forward directions independently away from the base plate 84 and are sized and spaced apart to receive and hold the side brace 98. Straps 106 (e.g., strap buckles or the like), which are coupled to the base plate 84, are manually wrapped around the aircraft component 22 and locked in place to secure the aircraft component 22 to the adapter 12.

Figure 9:
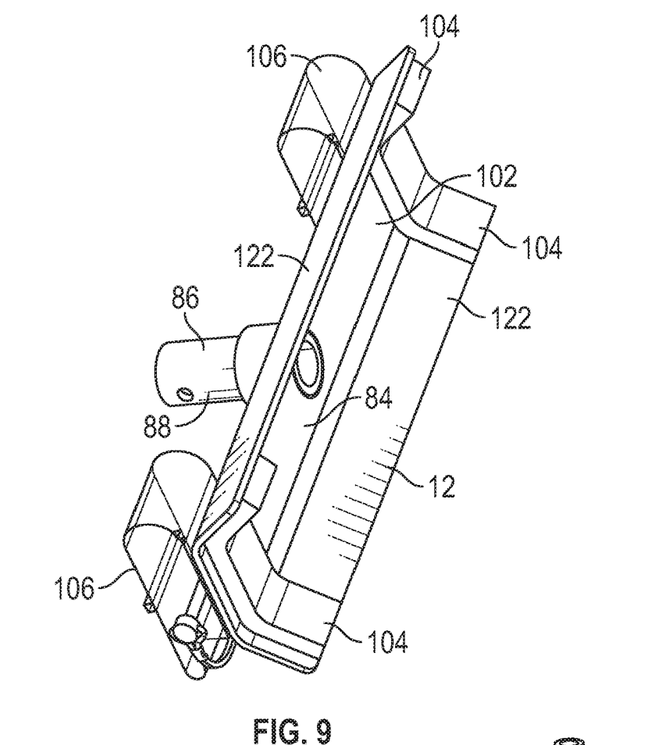
FIG. 9 illustrates a perspective view of an adapter in accordance with an exemplary embodiment.

In another example, and with reference to FIGS. 3 and 9, the aircraft component 22 is a shock strut 120 for an aircraft landing gear 100 and the adapter 12 is configured for removably coupling to the shock strut 120. As illustrated, the base plate 84 of the adapter 12 includes a rectangular base section 102 and sidewalls 122 extending in a generally forward direction from the rectangular base section 102. The sidearms 104 extend in the generally forward directions supported by the sidewalls 122 of the base plate 84 and are sized to receive and hold the shock strut 120. Straps 106 that are coupled to the rectangular base section 102, are manually wrapped around the aircraft component 22 and locked in place to secure the aircraft component 22 to the adapter 12.

Figure 12:
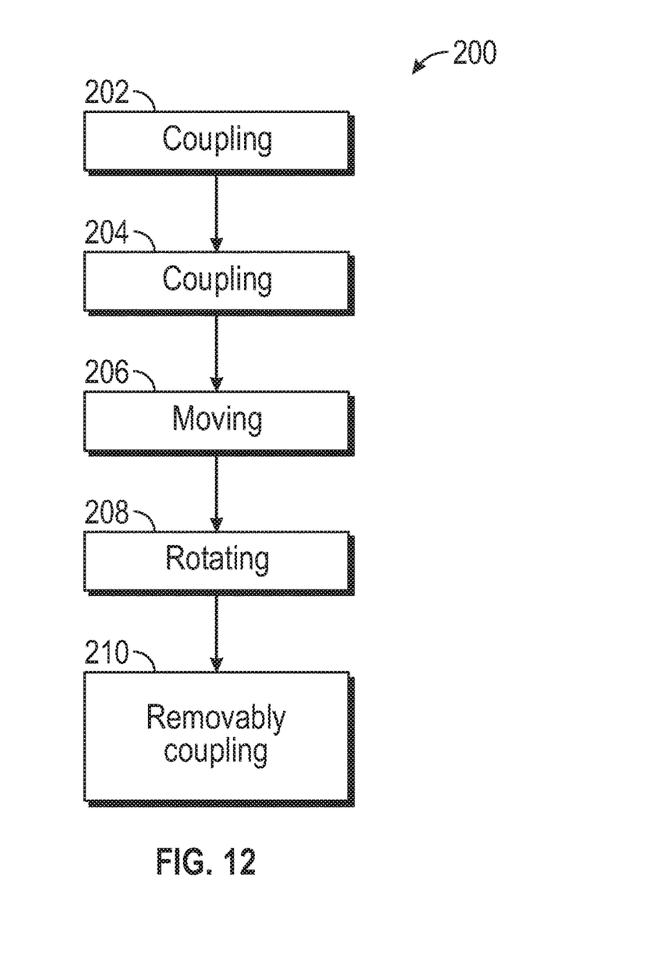
FIG. 12 illustrates a method for supporting an aircraft component adjacent to an aircraft in accordance with an exemplary embodiment.

Referring to FIG. 12, a method 200 for supporting an aircraft component adjacent to an aircraft in accordance with an exemplary embodiment is provided. The method 200 includes coupling (STEP 202) a winch subassembly to a lift. An adapter is coupled (STEP 204) to the winch subassembly. The lift is moved (STEP 206) to position the adapter adjacent to the aircraft. The adapter is rotated (STEP 208) with the winch subassembly. The aircraft component is removably coupled (STEP 210) to the adapter.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for supporting an aircraft component adjacent to an aircraft, the apparatus comprising:
    an adapter for removably coupling to the aircraft component; and
    a winch subassembly including:
        an axle coupled to the adapter and having a longitudinal axis aligned with the adaptor;
        a first gear operatively coupled to the axle to drive the axle to rotate about the longitudinal axis for rotating the adapter, wherein the winch subassembly is configured to couple to a lift to position the adapter adjacent to the aircraft.

2. The apparatus of claim 1, wherein the winch subassembly further includes a second drive gear that meshes with the first gear to drive the axle to rotate.

3. The apparatus of claim 2, wherein the first gear and the second drive gear are configured as a worm drive arrangement in which the first gear is a worm gear and the second drive gear is a worm screw gear that meshes with the worm gear.

4. The apparatus of claim 2, wherein the winch subassembly further includes a manual actuating member operatively coupled to the second drive gear for rotating the second drive gear.

5. The apparatus of claim 1, wherein the axle is fixedly coupled to the first gear.

6. The apparatus of claim 1, wherein the winch subassembly further includes:
    a mounting base; and
    a first axle guide that is coupled to the mounting base and that has a first guide opening formed therethrough, and wherein a first portion of the axle is disposed in the first guide opening.

7. The apparatus of claim 6, wherein the winch subassembly further includes a second axle guide that is spaced apart from the first axle guide, wherein the second axle guide is coupled to the mounting base spaced apart from the first axle guide and has a second guide opening formed therethrough, and wherein a second portion of the axle is disposed in the second guide opening.

8. The apparatus of claim 7, wherein the winch subassembly further includes a guard subassembly that is coupled to the mounting base and that is disposed about the first gear between the first and second axle guides.

9. The apparatus of claim 1, wherein the adapter includes:
a base plate; and
a tube section extending rearwardly from the base plate, wherein the tube section has a tube wall surrounding a channel, and wherein a distal portion of the axle is disposed in the channel coupled to the tube wall.

10. The apparatus of claim 9, wherein the adapter is removably coupled to the distal portion of the axle.

11. The apparatus of claim 9, wherein the tube section has at least one wall opening formed through the tube wall and the axle has an axle opening formed through the distal portion aligned with the at least one wall opening, and wherein the apparatus further includes a locking pin that is disposed through the at least one wall opening and the axle opening to couple the adapter to the distal portion of the axle.

12. The apparatus of claim 9, wherein the adapter further includes one or more sidearms that are coupled to the base plate on a side opposite the tube section, wherein the one or more sidearms are configured to receive the aircraft component.

13. The apparatus of claim 12, wherein the adapter further includes one or more straps that are coupled to the base plate and that are configured to wrap around the aircraft component to secure the aircraft component to the adapter.

14. The apparatus of claim 12, wherein the base plate is a substantially planar rectangular plate and the one or more sidearms extend in generally forward directions independently away from the base plate.

15. The apparatus of claim 12, wherein the base plate includes a rectangular base section and sidewalls extending in a generally forward direction from the rectangular base section, and wherein the one or more sidearms extend in the generally forward directions supported by the sidewalls of the base plate.

16. The apparatus of claim 12, wherein the aircraft component is one of a side brace and a shock strut for an aircraft landing gear, and wherein the adapter is configured for removably coupling to the one of the side brace and the shock strut.

17. An apparatus for supporting an aircraft component adjacent to an aircraft, the apparatus comprising:
an adapter for removably coupling to the aircraft component;
a winch subassembly including:
an axle coupled to the adapter and having a longitudinal axis aligned with the adaptor; and
a first gear operatively coupled to the axle to drive the axle to rotate about the longitudinal axis for rotating the adapter;
a support structure coupled to the winch subassembly and extending therefrom from in a direction away from the winch subassembly; and
a lift coupled to the support structure and configured to position the adapter adjacent to the aircraft.

18. The apparatus of claim 17, wherein the support structure is removably coupled to the lift.

19. The apparatus of claim 17, wherein the lift includes a pivot arm configured to move vertically and having a distal end section that includes a holding member with an opening formed therethrough, and wherein the support structure is configured as an elongated element that is disposed through the opening of the holding member.

20. A method for supporting an aircraft component adjacent to an aircraft, the method comprising the steps of:
coupling a winch subassembly to a lift, wherein the winch subassembly includes an axle that extends in a longitudinal direction and that is configured to rotate about the longitudinal axis;
coupling an adapter to the axle of the winch subassembly aligned with the longitudinal axis;
moving the lift to position the adapter adjacent to the aircraft;
rotating the adapter with the axle of the winch subassembly; and
removably coupling the aircraft component to the adapter.

* * * * *